United States Patent [19]
Milberger

[11] Patent Number: 4,586,366
[45] Date of Patent: May 6, 1986

[54] METHOD AND APPARATUS FOR MEASURING DRIVING RESISTANCE AND VELOCITY OF PILES DURING DRIVING

[76] Inventor: Lionel J. Milberger, 8911 Rocky La., Houston, Tex. 77040

[21] Appl. No.: 589,309

[22] Filed: Mar. 14, 1984

[51] Int. Cl.$^4$ .............................................. G01N 3/34
[52] U.S. Cl. ............................................ 73/12; 73/84
[58] Field of Search ................. 73/1 D, 11, 12, 82, 73/84, 493, 651, 594

[56] References Cited

U.S. PATENT DOCUMENTS

| | | | |
|---|---|---|---|
| 3,535,919 | 10/1970 | Budlong et al. | 73/84 |
| 3,946,598 | 3/1976 | Towne et al. | 73/12 X |
| 4,347,743 | 9/1982 | Rausche et al. | 73/493 X |

FOREIGN PATENT DOCUMENTS 1446661  8/1976  United Kingdom .................... 73/12

OTHER PUBLICATIONS

L. M. Moskalik, "Tensometric Accelerometers—With Overload Protection" Meas. Tech. (U.S.A.), vol. 22, No. 12, May 1980, pp. 1469–1471.

Primary Examiner—Charles A. Ruehl
Attorney, Agent, or Firm—Vaden, Eickenroht, Thompson & Jamison

[57] ABSTRACT

A method and apparatus for measuring the driving resistance and velocity of piles during driving utilizing a strain gage accelerometer mounted on the pile. The accelerometer is constructed of a material having high internal dampening characteristics and is excited by alternating current electric signals. The acceleration signals of the accelerometer are electronically integrated to provide a measurement of velocity and an accurate blow count, which may be simultaneously recorded on two separate recording media. The velocity measurements are integrated a second time to derive a measure of pile displacement for selected hammer blows, which in turn enables the driving resistance to be determined. Observation of the velocity measurement during pile driving operations permits anomalous data to be eliminated prior to the calculation of driving resistance.

23 Claims, 5 Drawing Figures

METHOD AND APPARATUS FOR MEASURING DRIVING RESISTANCE AND VELOCITY OF PILES DURING DRIVING

FIELD OF THE INVENTION

This invention relates to pile driving generally and, in particular, to a method of and apparatus for measuring the driving resistance of a pile and the velocity imparted to the pile by a blow from a pile driving hammer.

BACKGROUND OF THE INVENTION

Accelerometers are used to measure the acceleration of piles being driven into the earth by a pile driving hammer. This information is useful in measuring the efficiency of the pile driving hammer, as well as driving resistance of the pile, along with other useful measurements. Primarily, driving resistance is significant in that it must reach a predetermined level in order for the pile to adequately bear the desired load.

Conventional systems for measuring driving resistance and pile velocity utilize self-generating-type accelerometers, which, as the name implies, self-generate direct current electric signals. A quartz or piezoelectric crystal is compressed by the mass of the accelerometer during movement of the pile, producing electrical impulses proportional to the acceleration of the pile. The acceleration signals produced by the accelerometer are recorded and subsequently electronically integrated on separate equipment to produce a velocity measurement. The velocity measurements are in turn, electronically integrated a second time to produce a measurement of pile displacement. The number of recorded blows are determined for each linear unit of displacement to arrive at a "blow count". The "blow count" determines an average displacement per hammer blow for the pile. The force applied to the pile by the hammer is sensed simultaneously by separate apparatus. The force and average displacement can be related to driving resistance by known formulas which recognize soil conditions, pile configuration and desired depth of penetration. This final calculation is currently performed manually, usually on a "bearing graph".

However, conventional systems suffer from general inherent limitations. Specifically, self-generating accelerometers sometimes display a "zero offset error" in the acceleration signal during or just after the hammer blow to the pile. FIG. 1A graphically represents, in Line A, the force applied to a pile during a hammer blow. FIG. 1B graphically illustrates, in Line B, an accurate representation of the velocity of the pile as a result of the hammer blow. Line C in FIG. 1B shows a ramped portion constituting the integral of the "zero offset error". This ramp error distorts the observed displacement of the pile when the velocity signal is integrated, prevents an accurate measurement of driving resistance, as well as increasing or decreasing the apparent number of hammer blows depending on the direction of the ramp.

As a result, it has been customary to visually observe displacement of the pile and to manually record blows per unit of displacement to arrive at a "blow count". This method is inherently subject to human error and reduces the reliability of the computation of driving resistance, and is therefore unsatisfactory. Further, it is not possible using this method to calculate the driving resistance for a selected hammer blow, only an average figure over a certain amount of displacement.

Self-generating accelerometers, because they operate by generating direct current electric power, also inherently generate a displacement error in the acceleration reading caused by rapid movement through the ambient magnetic field.

Therefore, it is an object of this invention to provide improved method and apparatus for measuring the driving resistance and velocity of piles during driving.

It is another object of this invention to provide such an improved accelerometer that does not exhibit a zero offset error and displacement error when measuring the acceleration of piles being driven, thereby allowing accurate measurements of the blow count, velocity and displacement imparted to the pile by the hammer blow.

It is yet another object of this invention to provide an improved method and apparatus for measuring the driving resistance and velocity of a pile for selected individual hammer blows during driving.

Therefore, these and other objects and advantages of this invention will be apparent to those skilled in the art from a consideration of this specification, including the attached drawings and appended claims.

DETAILED DESCRIPTION OF THE INVENTION

The apparatus of the present invention constitutes a strain gage-type accelerometer as opposed to the self-generating-type previously employed. Strain gage-type accelerometers utilize one or more strain gages attached to an accelerometer body, which is in turn mounted on the object to be measured. Movement of the pile induces deformation and stress in the accelerometer body, which is detectable by the strain gages and is proportional to acceleration. Alternating current electricity is used to excite the strain gages.

Existing strain gage accelerometers have been used in laboratories and on small scale models to measure acceleration under controlled conditions. Heretofore, strain gage accelerometers have been considered unusable under the harsh conditions experienced in pile driving operations. One limitation has been that existing designs have a bandwidth which is too narrow for the accuracy required in pile driving. The bandwidth of a strain gage accelerometer is measured from 0 Hz (i.e., direct current) up to through the frequency of the alternating current electricity used to excite the accelerometer. However, this frequency must not be more than $\frac{1}{3}$ to $\frac{1}{2}$ of the inherent resonant frequency of the accelerometer body. Otherwise the vibration of the body interfers with the operation of the accelerometer. Because of the small size of existing accelerometers, this natural resonant frequency has been unnecessarily low and therefore the bandwidth of the accelerometer has been limited to approximately 5,000 Hz.

In addition, conventional strain gage accelerometers have been shown to be too fragile for pile driving applications in that the strain gages and the electrical leads frequently are dislodged from the accelerometer body during driving. However, what has not been appreciated prior to the present invention is that strain gages accelerometers do not produce the zero offset error and displacement error inherent in the self-generating accelerometers.

Therefore, according to the present invention, a strain gage accelerometer, generally indicated by the member 12, is utilized which has a natural resonant frequency for the accelerometer body that has been significantly increased over conventional designs. Specifically, a natural resonant frequency range of 30,000 Hz is utilized which enables the bandwidth of the accelerometer to be increased to 10,000 Hz, significantly improving the accuracy of the data collected. At the same time the increase in size of the accelerometer body needed to raise the resonant frequency produces a more rugged and durable configuration able to withstand driving conditions.

Figure 2A:
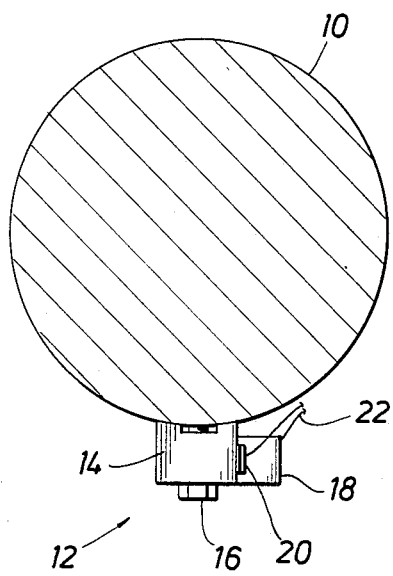
FIG. 2A is a top view of the apparatus of this invention used to measure the acceleration imparted to the pile by the pile driving hammer.
Figure 2B:
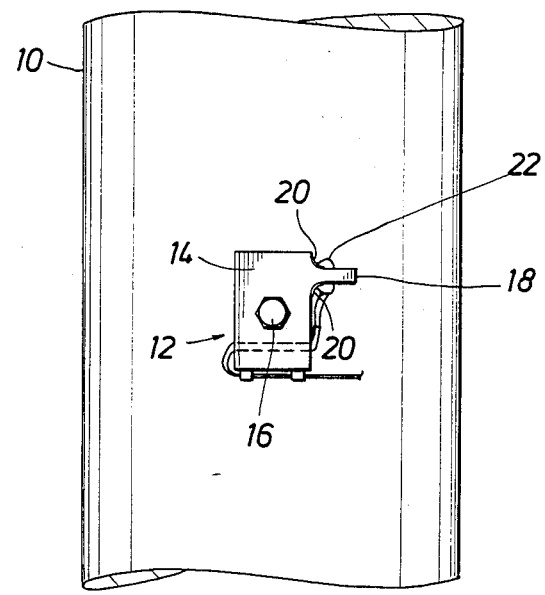
FIG. 2B is a side view of the apparatus of FIG. 2A.

Various types of strain gages accelerometers are known and may be applied to the method and apparatus of this invention. The illustrated embodiment utilizes an accelerometer body 14 attached by bolt 16 to the pile 10, which pile is constructed of concrete or like material, as shown in FIGS. 2A and 2B. Of course, this invention is equally applicable to a pile constructed of metal, such as steel, in which case block 14 may be welded or otherwise suitably affixed to the pile. Cantilever beam 18 extends transverse to the longitudinal axis of the pile and is integrally formed as part of body 14 of the accelerometer.

The material of the block possesses high internal dampening characteristics which quickly attenuate the vibration of the cantilever beam induced by the sudden acceleration of the pile. Preferably, the block is constructed of an alloy of manganese and copper which has dampening characteristics similar to a material such as lead, but has the strength to withstand the rigorous conditions experienced while mounted on the pile. Previous strain gage accelerometers did not appreciate the advantages of using this or a similar material.

Figure 1A:
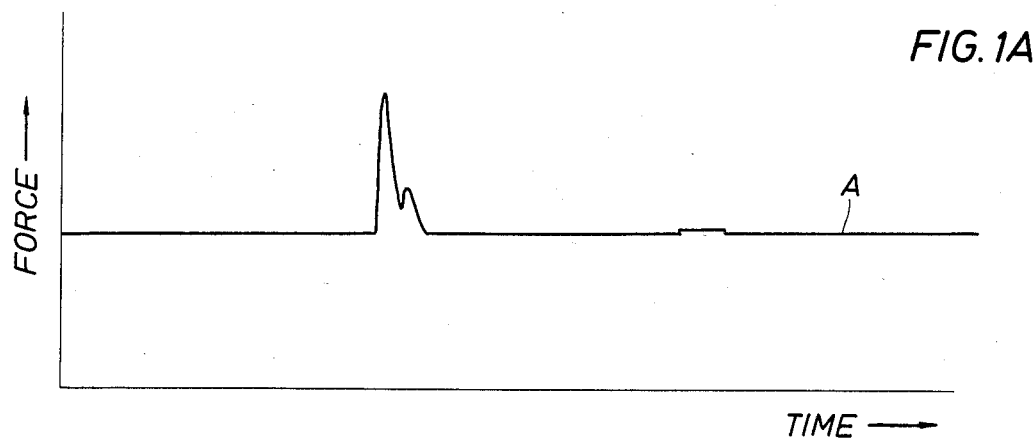
FIG. 1A is a graphical representation of the force applied to a pile by a pile driving hammer.
Figure 1B:
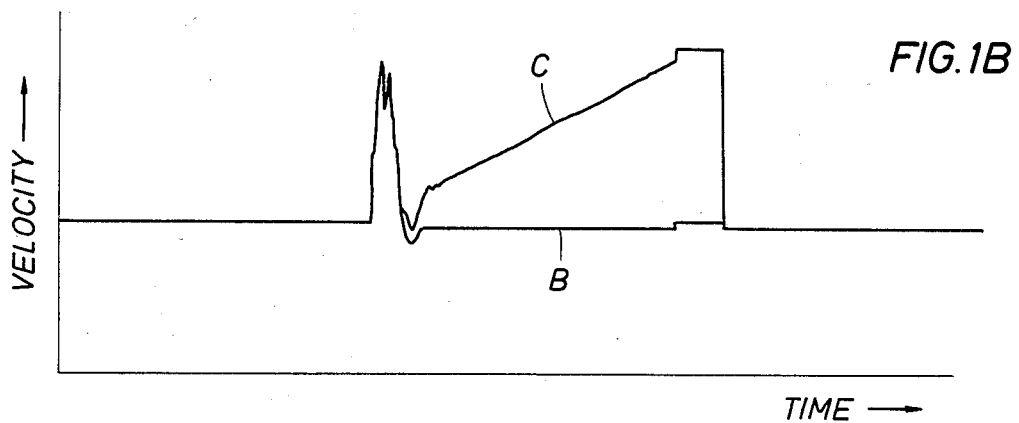
FIG. 1B is a graphical representation of the first integral of the acceleration signal from an accelerometer attached to a pile acted on by the force of FIG. 1A, showing the zero offset error produced by a self-generating accelerometer compared to the actual velocity of the pile.

Four strain gages 20 are attached to the cantilever beam, two mounted on the upper surface and two on the lower surface, preferably at the radius at which the beam joins the main body of block 14. More or fewer strain gages may be used as are found useful in a particular configuration or design. Also the strain gages may be connected in a different arrangement or attached on other portions of the accelerometer body. Electrical leads 21 connect the strain gages in a Wheatstone bridge configuration. The leads are securely fastened to the body and extend remotely to other apparatus now shown in FIG. 1, constituting the remainder of the invention for processing and transmitting the signals produced by the accelerometer. Separate force measuring devices (not shown) of conventional design, are also mounted on the pile to record the impact of selected hammer blows in conjunction with the remainder of the apparatus hereinafter discussed.

Figure 3:
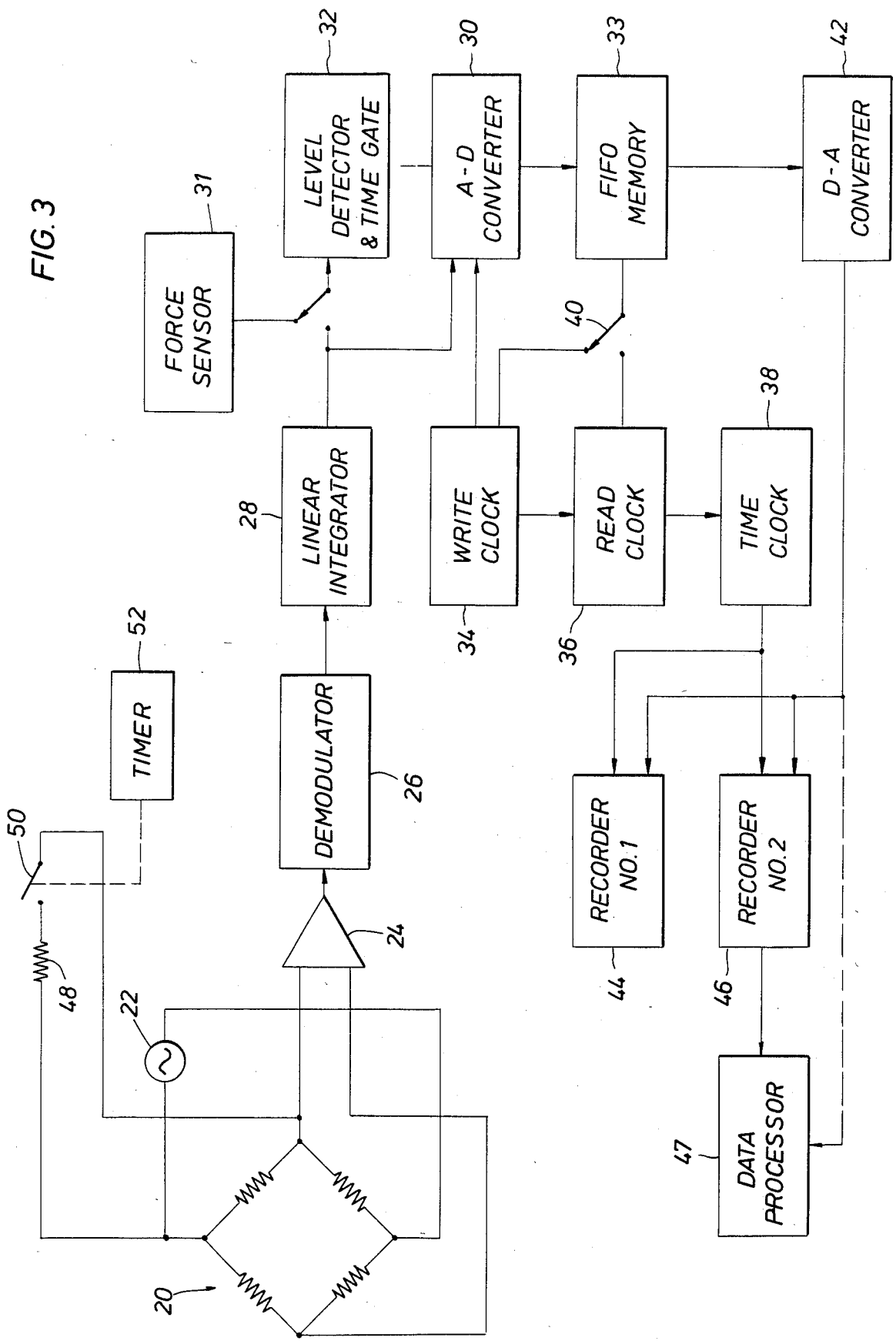
FIG. 3 is a schematic block diagram of the apparatus used to practice the method of this invention.

In FIG. 3, strain gages 20 are shown schematically connected to oscillator 22 which, as previously discussed, generates alternating current electrical signals to excite the strain gages of the accelerometer, preferably at 10,000 Hz. Stresses in cantilever beam 18 induced by longitudinal movement of the pile will cause the amplitude of the output of the strain gages to fluctuate in a manner which can be used as a measure of acceleration.

The output of the strain gages 20 is connected to amplifier 24 to provide a high strength output signal. The amplified signals from the amplifier are transmitted to phase sensitive demodulator 26 which converts the output of strain gages 20 to signals in which voltage is proportional to acceleration. The output of the demodulator is in turn transmitted to linear integrator 28 which electronically integrates the signals to produce signals in which voltage is directly proportional to velocity, the desired measurement. These signals are in turn transmitted to an analog-to-digital converter 30 which converts the signals into a digital format.

Level detector and time gate 32 monitors the output of integrator 28 such that the analog-to-digital converter will be activated only when voltage levels are detected above a predetermined threshold level. In other words, random signals in the absence of movement of the pile under impact of the driver will be ignored by the analog-to-digital converter. In addition, level detector and time gate 32 continues to actuate the analog-to-digital converter for a predetermined time, preferably 80 milliseconds or 160 milliseconds. This insures that an adequate amount of the velocity measurement will be taken.

Alternatively, the level detector and time gate may be connected by means of switch 29 to separate apparatus 31 which is a sensor resonsive to the force applied by the hammer, or alternatively, the bending moment of the pile.

Write clock 34 is free-running and connected to analog-to-digital converter 30 and digital memory 32, which stores the digital signals from the converter. As the signals are converted to digital format, the write clock generates a signal, preferably at 12,800 Hz to regulate the rate at which the signals are stored in the memory.

Switch 40 connects the write clock and the memory during driving operations. After a sufficient amount of data has been stored in the memory 33, switch 40 is turned to connect read clock 36 to the memory, for controlling the rate at which the contents of digital memory 33 are transmitted. Preferably, the read clock operates at a rate 1/40th that of the write clock, (i.e. at 320 Hz), so that data signals are transmitted to digital-to-analog converter 42 at a significantly slower rate than the rate at which they are stored. This enables recorders 44 and 46 to be simultaneously connected to the digital-to-analog converter to record the analog velocity signals and to the required bandwidth of the recorders to be reduced by a similar factor. Time clock 38 is connected to read clock 36 and generates signals which are stored on recorders 44 and 46 in conjunction with the analog velocity signals, to provide a real time reference when interpreting the data.

Recorder 44 may constitute a strip chart recorder which enables the pile driver operator to monitor the movement and condition of the pile as the driving is performed. In addition, the pile driver operator is able to identify and eliminate anomolous data from the record which may result from such things as the accelerometer body being loosened on the pile. Errors in the acceleration signal become immediately apparent to the operator, whereas conventional designs delayed access to this information for a substantial period of time. Under the present invention, malfunctions of the apparatus can be corrected immediately. Additionally, the strip chart record can be used to screen many hammer blows and to select one or several for further analysis. Recorder 46 may constitute a magnetic tape recorder which permits the operator to add voice annotation to the record concerning observed hammer performance, steam leaks, pile displacement or blow count information.

The output of recorder 46 is connected to data processsor 47, which may be located adjacent the pile driving site. One advantage of the present invention is that the recorder 46 and data processor 47 may be operated independently of the remainder of the apparatus and if necessary, simultaneously and while disconnected therefrom. Alternatively, and as shown in dotted line in FIG. 3, the output of digital-to-analog converter 42 may be connected directly to the data processor, which includes its own data storage capability. Data processor 47 electronically integrates the velocity signal to provide a measurement of pile displacement for each hammer blow. Since the zero offset error has been eliminated from the data, the data processor is able to determine the exact number of hammer blows electronically by measuring the peaks of velocity or displacement. Data processor 47 is also connected to the force measuring apparatus previously discussed, which transmits to the data processor the force measurements for the hammer blows selected by the operator. The data processor, uses the relationships previously discussed to automatically and electronically calculate driving resistance of the pile, rather than manually as before. Since anomolous data such as the zero offset error has been eliminated, the data processor may be used to calculate the driving resistance based on an average of selected displacement measurements to increase the accurancy. Alternatively, the data processor is capable of calculating the driving resistance for individual selected hammer blows rather than an average. This capability is particularly important as the driving resistance approaches the desired threshold level.

A means is also provided with the system of the present invention to calibrate the accelerometer to compensate for fluctuating operating conditions such as temperature, humidity, etc. or for long term drift of the component values. Specifically, when the block and accelerometer of the present invention are attached under controlled conditions to a calibration object (not shown) and dropped from a known height, a known velocity will be achieved which can be measured upon impact by the method and apparatus hereinabove discussed. Timer 52 in FIG. 3 controls a switch 50 for generating a calibration signal while precision calibration resistor 48 shunts one of the strain gages of the accelerometer. The accelerometer when excited by the oscillator and connected to the shunt resistor for a known period of time, for instance for 5 milliseconds, will generate a simulated acceleration output signal. This simulated acceleration signal is passed through the linear integrator, and compared to the signal generated during the drop from the known height. The ratio of these quantities can be used to generate a calibration factor.

The calibration resistor is again connected by the timer through switch 50 to one of the strain gages under actual operating conditions for a similar period of time. The variation in the simulated acceleration signal from that generated under controlled conditions can be used to compensate for fluctuations in such factors as temperature and humidity which effect the values of the electronic components of the apparatus. Preferably, the calibration consists of adjusting the gain of amplifier 24. Thus, by measuring acceleration, velocity, and displacement in one process, only one calibration of the apparatus is required. Prior systems required a separate calibration for the accelerometer and a second calibration for the remainder of the apparatus required to generate the driving resistance.

The foregoing disclosure and description of the invention is illustrative and explanatory thereof, and various changes in the method steps as well as the details of the illustrated apparatus may be made within the scope of the pending claims without departing from the spirit of the invention.

What is claimed is:

1. Apparatus for measuring the driving resistance and velocity of piles during driving, comprising:
    (a) a strain gage accelerometer adapted for mounting on the pile, responsive to longitudinal movement of the pile and having a body constructed of a material having high internal dampening characteristics;
    (b) an oscillator connected to said accelerometer;
    (c) a phase sensitive demodulator connected to said strain gage accelerometer for converting analog signals from said accelerometer into analog signals in which voltage is proportional to acceleration of the pile; and
    (d) an electronic integrator connected to said demodulator for converting said demodulated acceleration signals into analog velocity measurements.

2. The apparatus of claim 1, further including calibration means connected to said accelerometer for adjusting the output signals of said integrator to compensate for fluctuations in operating conditions.

3. The apparatus of claim 2, wherein said calibration means comprises:
    (a) a calibration resistor connected across one of said strain gages of said accelerometer through a switch;
    (b) a timer connected to said switch for controlling the period of time in which said switch is closed and said calibration resistor is shunted across said strain gage so as to generate a simulated acceleration signal.

4. The apparatus of claim 1, further including recording means connected to said integrator for recording said analog velocity measurements of the apparatus.

5. The apparatus means of claim 4, wherein said recording means comprises:
    (a) an analog-to-digital converter connected to said integrator for converting said analog signals thereof into digital format;
    (b) a memory for storing said digital velocity signals from said analog-to-digital converter in a first in, first out sequence;
    (c) a write clock connected to said memory for determining the rate at which said digital velocity signals are stored within said memory;
    (d) a read clock connected to said memory for controlling the rate of transmission of the digital signals from said memory at a rate substantially different than the rate at which said digital signals are stored in said memory;

(e) a digital-to-analog converter connected to said memory for converting said digital signals into analog form;

(f) a first recording means connected to said digital-to-analog converter for recording the analog velocity signals;

(g) a second recording means connected to said digital-to-analog converter means for simultaneously recording the analog velocity signals; and (h) a time clock connected to said first and second recording means for providing a real time reference for the recorded analog velocity signals.

6. The apparatus of claim 5, further including:

(a) a force sensor adapted for mounting on the pile and responsive to the force applied to the pile by a selected hammer blow;

(b) a data processor connected to said force sensor and said second recording means and including an electronic integrator for converting the velocity signals from said second recording means into a measurement of the displacement of the pile for selected hammer blows, said data processor determining the driving resistance of the pile based on the force and displacement measurements.

7. The apparatus of claim 6, wherein said data processor calculates an average driving resistance of the pile based on an average of the force and pile displacement measurements for selected hammer blows.

8. The apparatus of claim 6, wherein said data processor calculates the driving resistance for a selected hammer blow, based on the measured displacement and force for a selected hammer blow.

9. The apparatus of claim 1, further comprising an amplifier connected to said accelerometer and to said demodulator for amplifying the strength of said signals being transmitted to said demodulator.

10. Apparatus for measuring the acceleration imparted to a pile by a pile driving hammer, comprising: a strain gage accelerometer responsive to longitudinal movement of the pile adapted for mounting on the pile and having a body constructed of a material having high internal damping characteristics.

11. The apparatus of claim 1 or 10 wherein said body is constructed of a manganese-copper alloy.

12. The apparatus of claim 1 or 10 wherein said accelerometer includes a body having a integrally formed cantilever beam adapted to extend transverse to the longitudinal axis of the pile when said accelerometer is mounted thereon and a plurality of strain gages mounted on said beam.

13. A method for measuring the driving resistance and velocity of piles during driving:

(a) mounting a strain gage accelerometer on the pile responsive to longitudinal movement of the pile, said accelerometer having a body constructed of a material having a high internal dampening characteristics;

(b) energizing said strain gage accelerometer with alternating current signals;

(c) sensing the output of said strain gage accelerometer for a time period during which a blow is delivered to the pile by a hammer;

(d) demodulating the said sensed output of the strain gage accelerometer so as to produce demodulated signals in which voltage is proportional to acceleration; and (e) integrating the demodulated signals to produce analog signals having a voltage proportional to the velocity imparted to the pile by the hammer.

14. The method of claim 13, further comprising the step of:

amplifying the output signals of the strain gage prior to demodulation in step (d).

15. The method of claim 13, further comprising the steps of:

converting the analog velocity signals into digital form;

storing the digital signals in a memory in a first-in, first-out sequence at a first rate;

transmitting the digital signals stored in the memory at a second transmission rate substantially different than the first transmission rate;

converting the digital signals transmitted from said memory into analog form;

recording the analog signals from said digital-to-analog converter on a first recording means; and recording said analog signals from said digital-to-analog converter on a second recording means.

16. The method of claim 15, further comprising the steps of:

detecting the voltage level of a control signal;

comparing said voltage level of said control signal with a predetermined threshold voltage level;

blocking the conversion of said voltage signal from analog-to-digital format when the detected voltage level of said control signal is below said predetermined threshold level.

17. The method of claim 16, wherein said control signal is the analog velocity signal after integration.

18. The method of claim 17, further comprising the steps of:

(t) counting the number of selected hammer blows;

(u) integrating said analog velocity signal stored on either of said first or second recording means so as to derive a measure of the displacement of the pile for selected hammer blows;

(v) sensing the force applied to the pile by a selected hammer blow;

(w) calculating an average pile displacement for the selected hammer blows based on the blow count calculated in step (t); and (x) determining an average driving resistance for the plurality of selected hammer blows based on the average pile displacement and force.

19. The method of claim 15, further comprising the steps of:

(q) integrating said analog velocity signal stored on either of said first or second recording means so as to derive a measure of the displacement of the pile for selected hammer blows;

(r) sensing the force applied to the pile by a selected hammer blow; and (s) determining the driving resistance for selected hammer blows based on the pile displacement and pile force.

20. The method of claim 13, further comprising the steps of:

calibrating said strain gage accelerometer prior to sensing movement of the pile during driving.

21. The method of claim 20, wherein said calibration step comprises the steps of:

(a) dropping said accelerometer a known height so as to develop a predetermined velocity and generate an acceleration signal;

(b) storing the first integral of the output signal of accelerometer at the predetermined velocity;

(c) connecting a calibration resistor to said accelerometer under controlled environmental conditions and for a predetermined amount of time so as to generate a simulated accleration signal;

(d) storing a first integral of the resulting signal generated by said acclerometer in step (c);

(e) comparing the stored signal from said accelerometer at the predetermined velocity with the stored signal of said accelerometer while connected to said resistor to determine a ratio therebetween;

(f) connecting said calibration resistor to said accelerometer under operating conditions for the same period of time as in step (c) so as to generate a simulated acceleration signal;

(g) comparing the first integral of the resulting output signal of accelerometer when connected to said resistor under said operating conditions, with the stored signal of said accelerometer while connected to said resistor under controlled conditions; and (h) adjusting the apparatus responsive to a comparison of the outputs signals as in step (g), using the ratio of step (e) so as to compensate for fluctuating operating conditions.

22. The method of claim 21, wherein step (h) comprises the step of: amplifying or attenuating the output signal of said accelerometer so as to compensate for fluctuating environmental conditions.

23. A method for measuring the driving resistance and velocity of piles during driving:

(a) mounting a strain gage accelerometer on the pile responsive to longitudinal movement of the pile;

(b) energizing said strain gage accelerometer with alternating current signals;

(c) sensing the output of said strain gage accelerometer for a time period during which a blow is delivered to the pile by a hammer;

(d) demodulating the said sensed output of the strain gage accelerometer so as to produce demodulated signals in which voltage is proportional to acceleration; and (e) integrating the demodulated signals to produce analog signals having a voltage proportional to the velocity imparted to the pile by the hammer.

* * * * *